July 22, 1941.                R. S. BAKER                2,250,324
                       BAND SAW GUARD AND GUIDE
                         Filed Sept. 26, 1938                2 Sheets-Sheet 1

Inventor
Robert S. Baker,
By
Attorneys

July 22, 1941.  R. S. BAKER  2,250,324
BAND SAW GUARD AND GUIDE
Filed Sept. 26, 1938  2 Sheets-Sheet 2
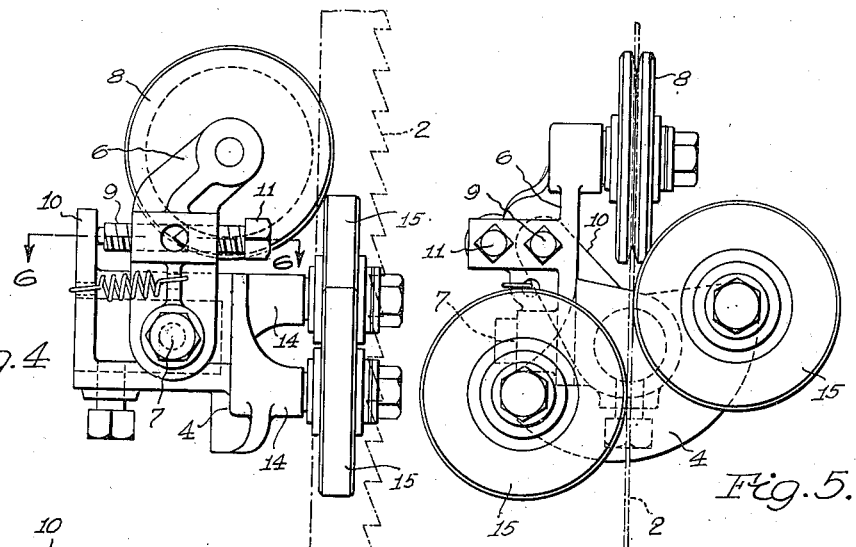
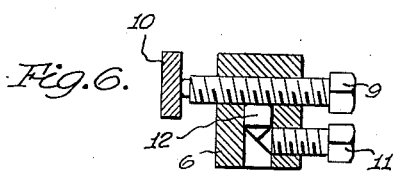
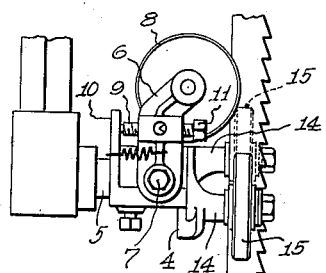
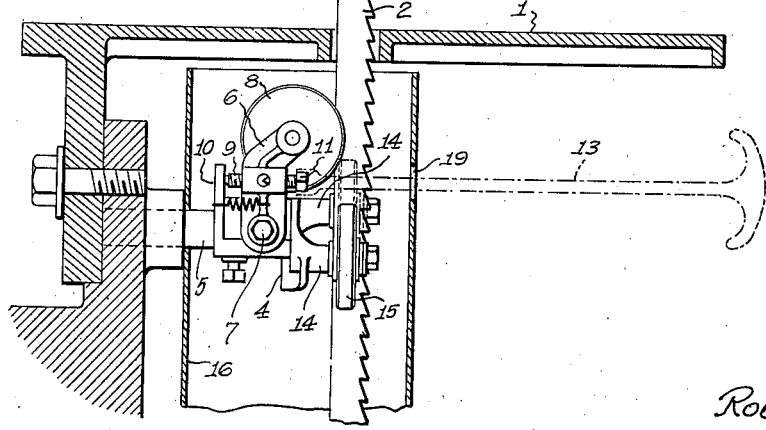
Inventor
Robert S. Baker,
By
Attorneys Patented July 22, 1941

2,250,324

UNITED STATES PATENT OFFICE 2,250,324

BAND SAW GUARD AND GUIDE

Robert S. Baker, Detroit, Mich.

Application September 26, 1938, Serial No. 231,674

1 Claim. (Cl. 143—162)

This invention relates to a band saw guard or guide, and an object of the present invention is to provide a construction and arrangement whereby adjustment of the backing guide roll for the band saw blade is facilitated and danger of injury to the hand of the operator in making such adjustment is eliminated.

A further object is to provide a casing for enclosing the guiding mechanism and for conducting away the sawdust, which casing is constructed and arranged to facilitate adjustment of the backing roll from the front of the machine. It is also an object to provide an adjustable bracket for supporting the guide rolls adjacent to the lower side of the machine table and which bracket is arranged to carry the guide rolls and provide a free passage between the bracket and rolls for the downward discharge of the sawdust and other matter produced by the operation of the saw, to prevent clogging of the guiding means, this material being discharged into the upper open end of a casing enclosing the guiding mechanism.

A further object is to provide certain other new and useful features in the construction and arrangement, all as hereinafter described and shown in the accompanying drawings, in which Figure 1 is a partial front elevation of a band saw machine with portions of the casing for the lower guiding mechanism, broken away and in section;

Fig. 3 is a sectional view showing the table and casing for the lower guiding mechanism in section substantially upon the plane of the band saw and showing the upper and lower guiding mechanisms in elevation;

Fig. 4 is a side elevation of one of the guiding mechanisms;

Fig. 5 is a front end view of the mechanism shown in Fig. 4, and

Fig. 6 is a sectional detail substantially upon the line 6—6 of Fig. 4.

Figure 1:
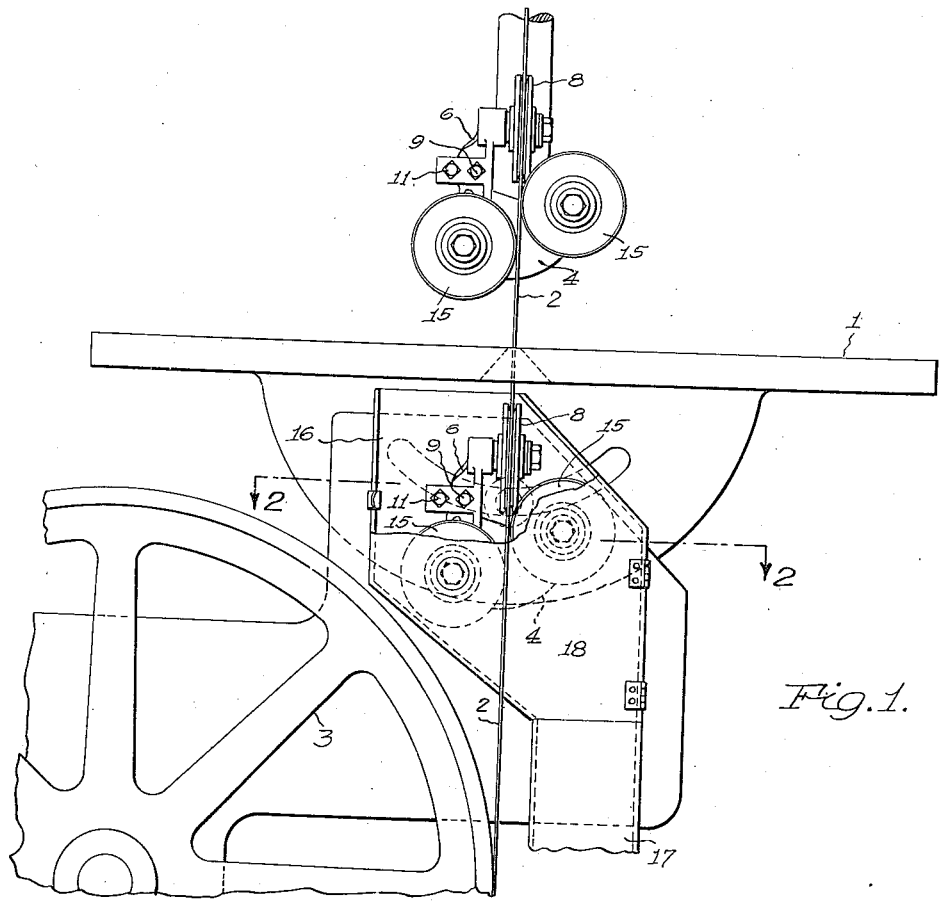

As in the usual construction the band saw machine includes an adjustable work supporting table 1 having a slot therein for the passage therethrough of the continuous band saw blade 2, this band saw blade passing over a large lower driving wheel 3 and over a similar wheel above the table which upper wheel is not shown in the drawings. A band saw guiding means is provided above the table and a similar guiding mechanism is shown below the table, these guiding devices being mainly shown in my United States Patent No. 2,135,488, issued November 8, 1938, on my copending application for United States Patent filed August 3, 1936, Serial No. 94,037, these guiding mechanisms as shown in the present application being modified in certain respects as hereinafter set forth.

The upper and lower guiding mechanisms each comprises an adjustably supported bracket 4 mounted for rotative movement upon the end of a fixed stud 5 and each bracket includes an arm 6 pivotally supported at 7 for forward and rearward swinging movement and upon the upper end of which is journaled a backing guide roll 8 arranged to engage at its periphery, the back edge of the saw blade 2, this roll carrying arm being adjustable toward the saw blade by means of an adjusting screw 9 passing transversely of said arm through a screwthreaded opening therein and adapted to engage at its rear end, a lug 10 formed integral with the bracket 4. Turning inwardly of the screw 9 will swing the arm 6 toward the rear edge of the saw blade and thus adjust the backing roll 8 toward the saw blade to accommodate different widths of blade, and when this adjustment of the screw 9 has been made, it is held in adjusted position by means of a set screw 11 extending from the forward side of the arm 6 and projecting toward the front side of the machine, this set screw 11 being adapted to engage a locking plug 12 mounted within a bore in the arm 6 and extending at right angles to the axis of the adjusting screw 9 and adapted to be forced into engagement with said screw by means of the set screw 11 which extends at right angles to the locking plug 12, the outer end of the plug and the inner end of the screw being formed with like conical ends to engage each other and thus force the plug into locking engagement with the screw 9 when the set screw 11 is turned inwardly.

By this arrangement of the adjusting screw and set screw in longitudinal parallel relation with both screws extending toward the forward side of the machine, these screws may be turned by means of an elongated handle socket wrench indicated at 13, and extending forwardly toward the forward side of the machine so that the screw 9 may be adjusted and then locked in adjusted position to hold the roll 8 in the position to which it is adjusted, without the necessity for reaching into the small space between the wheel 3 and the lower side of the table 1, and by reason of this arrangement, the adjustment of the backing roll may be effected with facility from the forward side of the machine and without stopping the band saw. The operation of adjusting the backing roll may therefore be quickly effected and without danger of injury to the hand of the operator while the band saw machine is in operation, this adjustment being a new feature of the present construction of guiding mechanism over that shown in my pending application for patent.

The bracket 4 upon which the roll 8 is mounted, is also formed with two parallel studs 14 which extend toward the forward side of the machine and are spaced apart to form a passage therebetween and between the bracket and the rear edge of the blade, this passage forming a clear space for the sawdust and other particles released by the sawing operation of the blade so that they will pass freely downward and not clog the guide roll 8 or the lateral rolls 15 which are mounted for free turning movement upon the ends of the studs 14 to engage opposite sides of the saw blade.

Figure 2:
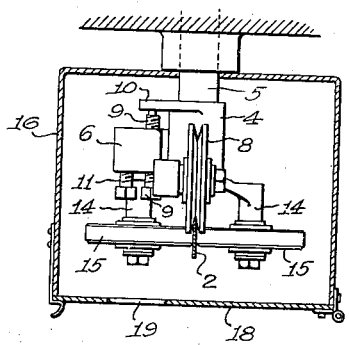
Fig. 2 is a cross section substantially on the line 2—2 of Fig. 1.

To conduct away the sawdust as it passes downwardly, a casing 16 is provided beneath the table 1 and enclosing the lower guide mechanism, this casing terminating at its lower end in a pipe 17 so that air may be drawn through the casing by means of any suitable suction device, not shown, attached to the pipe 17, the upper end of such casing being open and its forward side being closed by a hinged door 18 as shown in Fig. 2 to permit access to the interior of the casing and the guiding mechanism, the forward side of the casing or the door 18 being provided with an opening 19 for the insertion of the socket wrench 13 to engage the adjusting and set screws and effect the adjustment of the backing roll 8.

With this arrangement the adjustments for the guiding mechanism may be made without stopping the operation of the saw as the long handled socket wrench projecting forwardly of the machine brings the operator's hands a considerable distance from the saw and thus provides for adjustment of the guide rolls without danger of injury to the operator's hand in making such adjustments. Further, by providing a closed casing for the guiding mechanism below the table, dust and dirt is rapidly conveyed away and by reason of the free passage of this dust and dirt through the guiding mechanism which is provided with an open passage therefor, all clogging of the mechanism is prevented even when the band saw is operated upon plaster board, the sawdust or particles formed by the saw cutting the board and which are very apt to adhere to any guide mechanism for the saw, will pass downwardly through the casing and be quickly discharged without clogging either the upper or lower guiding mechanisms.

Having thus fully described my invention what I claim is:

In a band saw machine, a bracket, a support pivoted on said bracket, a roller carried by said support for engaging the band saw, an adjustment screw threaded into a bore in and extending through said support into engagement with said bracket, said screw being operable to move said support around its pivot to adjust the position of said roller relative to the band saw, said support having a bore transverse to and intersecting said first-named bore, a pin in said second-named bore having one end in engagement with said screw, the other end of said pin being conical, and a screw parallel with said first-named screw and having a conical end projecting into said second-named bore in engagement with the conical end of said pin to urge the latter into locking engagement with said first-named screw.

ROBERT S. BAKER.